United States Patent [19]

Garau et al.

[11] Patent Number: 5,388,342
[45] Date of Patent: Feb. 14, 1995

[54] ASSEMBLY FOR SUPPORTING AND GUIDING A MOVABLE MEMBER OF A MACHINE, PARTICULARLY A MEASURING MACHINE

[75] Inventors: Enrico Garau, Turin; Pasqualino Poggi, Moncalieri; Domenico Sola, Rivalta, all of Italy

[73] Assignee: DEA SpA, Turin, Italy

[21] Appl. No.: 98,457

[22] Filed: Jul. 27, 1993

[30] Foreign Application Priority Data

Jul. 31, 1992 [IT] Italy .................... TO92 A 000660

[51] Int. Cl.⁶ ................ G01B 5/03; G01B 7/03
[52] U.S. Cl. .......................... 33/503; 33/1 M
[58] Field of Search ................ 33/503, 1 M

[56] References Cited

U.S. PATENT DOCUMENTS

| | | | |
|---|---|---|---|
| 3,750,295 | 8/1973 | Nordmann et al. | 33/503 |
| 4,630,381 | 12/1986 | Sakata et al. | 33/503 |
| 4,651,439 | 3/1987 | Band et al. | 33/503 |
| 4,887,360 | 12/1989 | Hemmelgarn et al. | 33/503 |

FOREIGN PATENT DOCUMENTS 47-22911 6/1972 Japan .................... 33/1 M

Primary Examiner—Christopher W. Fulton
Attorney, Agent, or Firm—Michael N. Meller

[57] ABSTRACT

An assembly for supporting and guiding a movable member of a machine along an axis "X" relative to a support member of the machine. The assembly includes first and second slide surfaces on the support member lying in planes which intersect with each other and extend parallel to the "X" axis, a pair of pneumatic bearing pads are fixed to the movable member and are slidable on respective slide surfaces. A third slide surface is formed on the support member and extends parallel to the "X" axis in a plane inclined to the planes including the first and second slide surfaces. A third bearing pad is fixed to the movable member and is slidable on the third surface in an arrangement to balance the loads exerted by the first and second bearing pads.

14 Claims, 2 Drawing Sheets

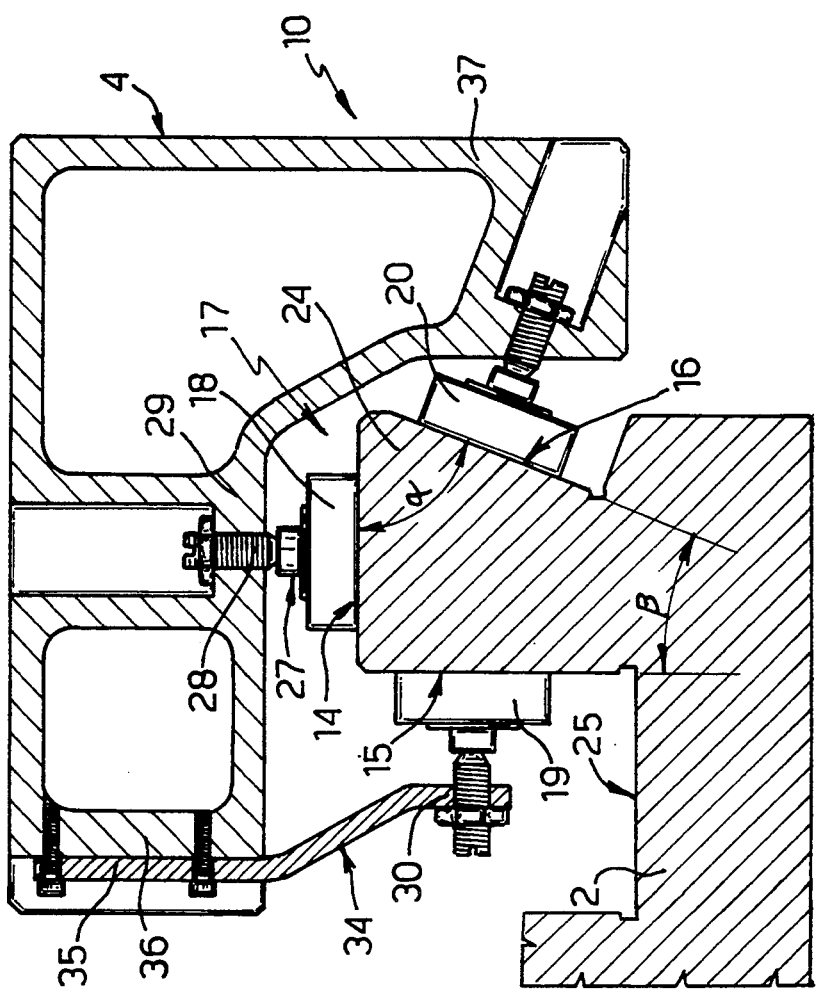
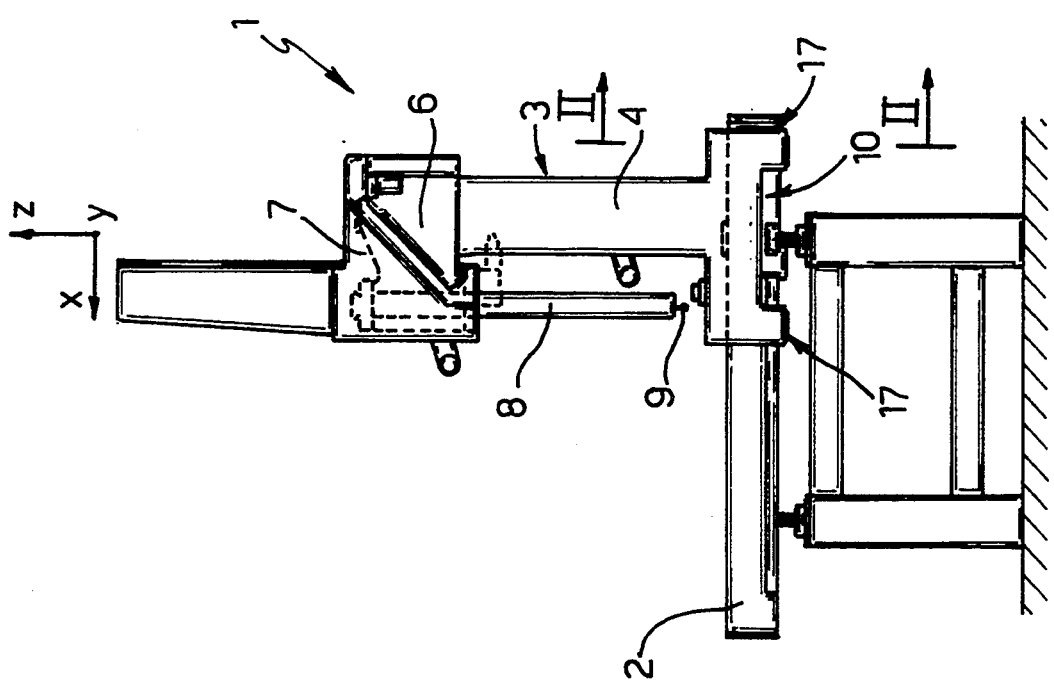

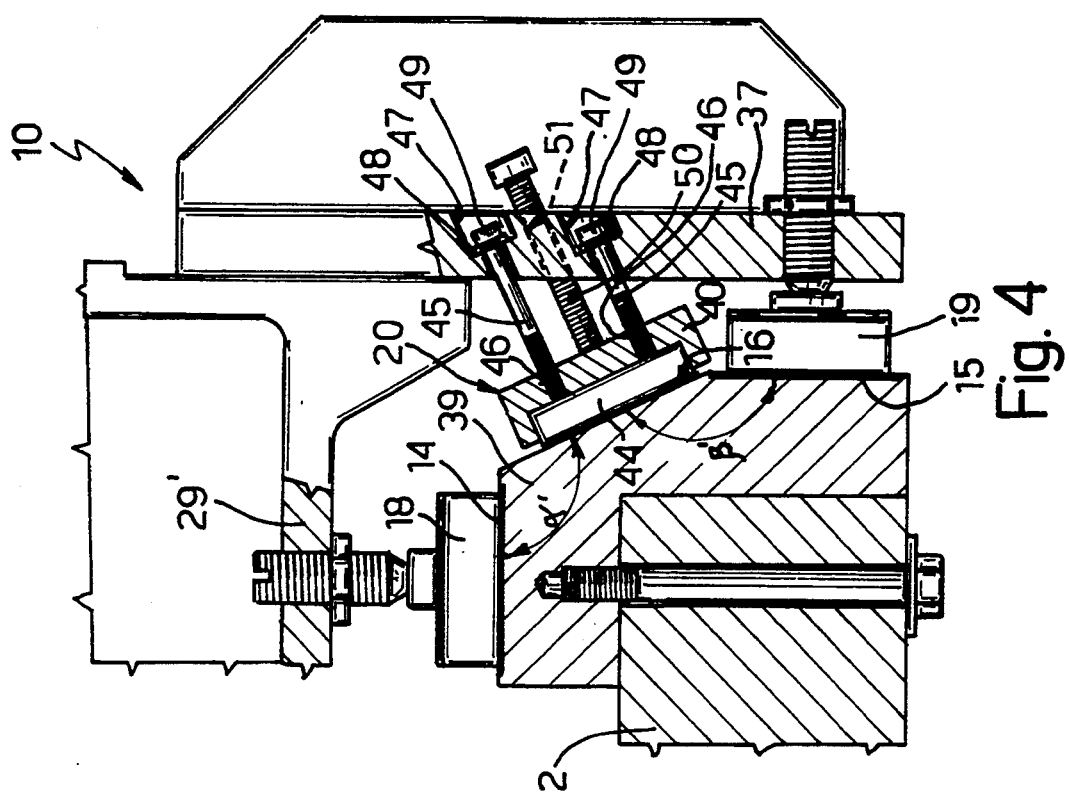
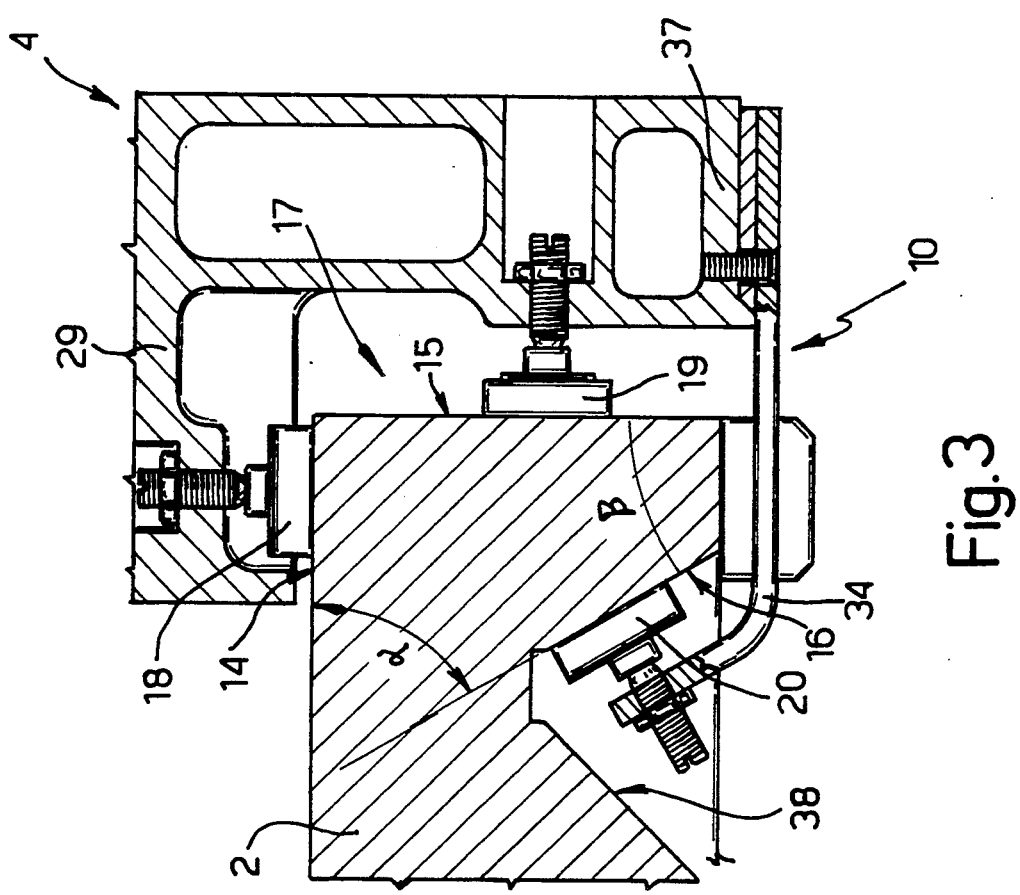

5,388,342

ASSEMBLY FOR SUPPORTING AND GUIDING A MOVABLE MEMBER OF A MACHINE, PARTICULARLY A MEASURING MACHINE

BACKGROUND OF THE INVENTION

The present invention relates to an assembly for supporting and guiding a movable member of a machine for movement along an axis, particularly for a measuring machine.

Measuring machines are known which include a fixed base, a plurality of members movable along respective coordinate axes relative to the base and a tracer point adapted to be moved by the movable members along these axes.

In a typical configuration, the movable members consist of a portal movable relative to the base along a first horizontal axis (X) and having a cross-member extending along a second horizontal axis (Y) perpendicular to the first, a carriage carried by the portal and slidable on the cross-member along the Y axis, and a head carried by the carriage and movable relative thereto along a vertical axis (Z); the tracer point being fixed to the head in use.

In known machines of the type described briefly above, the portal is fixed to the base by a support and guide assembly including a plurality of flat slide surfaces formed on the base and extending parallel to the X axis and respective bearing pads, for example of the pneumatic type, fixed to the portal and arranged to slide on these surfaces. The arrangement of the slide surfaces and of the respective bearing pads is such as to prevent the portal from moving in the Y and Z directions; for this purpose, two slide surfaces are generally provided extending perpendicular to the Y axis and on which respective bearing pads act in opposition to each other so as to bear the loads acting in the two directions along the Y axis; similarly, two slide surfaces are provided perpendicular to the Z axis on which respective bearing pads act which oppose each other so as to bear the loads acting in the two directions along the Z axis.

This configuration, although being satisfactory from the point of view of performance, has the disadvantage of being rather expensive. This expense is due to the use of a large number of bearing pads and to the mechanical working of the four tracks which must be such as to ensure that their dimensions are extremely precise and they have a high quality finish.

SUMMARY OF THE INVENTION

The object of the present invention is to provide a guide and support assembly for a movable member of a machine adapted to move along an axis, which does not have the disadvantage mentioned above.

This object is achieved by the present invention in that it relates to an assembly for supporting and guiding a movable member of a machine for movement along an axis relative to a support member of the machine itself, of the type comprising a first slide surface formed on the support member and extending parallel to the said axis, at least a first bearing pad fixed to the movable member and slidable on the first surface, a second slide surface formed on the support member and extending parallel to the said axis, at least one second bearing pad fixed to the movable member and slidable on the second surface, the first and second surfaces extending in respective planes which intersect each other, characterised in that it includes a third slide surface formed on the support member and extending in a direction parallel to the said axis and in a plane inclined to the said planes in which the first and second slide surfaces lie, and at least a third bearing pad fixed to the movable member, slidable on the third surface and arranged to balance the loads exerted by the first and second bearing pads on the first and second slide surfaces.

BRIEF DESCRIPTION OF THE DRAWINGS

In order to provide a better understanding of the present invention, several preferred embodiments will now be described, purely by way of non-limiting example, with reference to the appended drawings, in which:

FIG. 1 is a schematic side elevational view of a portal measuring machine provided with a support and guide assembly for the portal according to a first embodiment of the present invention;

FIG. 2 is a section taken on the line II—II of FIG. 1, on an enlarged scale, illustrating the portal support and guide assembly;

FIG. 3 is a section similar to that of FIG. 2, illustrating a second embodiment of the portal support and guide assembly according to the present invention; and FIG. 4 is a section similar to that of FIG. 2 illustrating a third embodiment of the portal support and guide assembly according to the present invention.

DETAILED DESCRIPTION OF THE INVENTION

With reference to FIG. 1, a measuring machine is generally indicated 1 and comprises essentially a flat base 2 parallel to a pair of horizontal axes X and Y of a set of three cartesian axes X, Y, Z, a portal 3 movable relative to the base 2 along the X axis and having a pair of uprights 4 and a cross-member 6 extending parallel to the Y axis (perpendicular to the plane of FIG. 1), a carriage 7 carried by the cross-member 6 of the portal and movable thereon along the Y axis, and a head 8 carried by the carriage 7 and movable relative thereto along the Z axis. A tracer point 9 is fixed to a lower end of the head 8 in use.

An upright 4 of the portal 3 is guided on the base 2 which is made for example of granite, by a support and guide assembly generally indicated 10 adapted to enable sliding along the X axis and to prevent any other degrees of translational or rotational freedom about the Y and Z axes. This assembly 10 includes essentially three slide surfaces 14, 15, 16, (FIG. 2) formed close to a side edge of the base 2 and extending parallel to the X axis in a relative arrangement explained in detail below, and two pneumatic support units 17 each including three pneumatic bearing pads 18,19,20 adapted to cooperate with the surfaces 14,15,16 respectively. The units 17, as illustrated in FIG. 1, are spaced from each other along the X axis so as to provide the support with high rotational rigidity about the Y and Z axes. The assembly 10 further includes a pneumatic circuit for supplying the bearing pads 18,19,20, not illustrated in that it is known.

The other upright, not visible in the drawings, is provided with simplified support means, also not illustrated, for fixing the upright itself to the base 2 in a vertical sense as well as for preventing the portal 3 from rotating about the X axis together with the assembly 10.

FIGS. 2, 3 and 4 illustrate three different embodiments of the assembly 10; in each of these drawings, a single unit 17 is illustrated, the other units 17 clearly having identical characteristics. These embodiments are described below with the use, for each, of the same reference numerals to identify similar or corresponding parts.

With reference to FIG. 2, the surfaces 14, 15 and 16 constitute the faces of a prismatic guide 24 having a section shaped substantially like a right-angled trapezium with its shorter base integral with the base 2 and extending along a side edge of the base itself. Conveniently, this guide is separated from the working plane of the base, not illustrated in FIG. 2, by a rectangular section channel 25.

The surface 14 is horizontal and constitutes the upper face of the guide 24, defining, in section, the longer base of the trapezium; the surface 15 is vertical and constitutes a side face of the channel 25; the surface 16, constituting the outer side face of the guide 24, lies in a plane inclined so as to form respective acute internal dihedral angles $\alpha$ and $\beta$ with the planes in which the surfaces 14 and 15 lie.

The bearing pad 18 is mounted by means of a ball joint 27 on an end of a threaded adjustment pin 28 screwed into a base wall 29 of the upright 4 of the portal 3 and cooperates with the surface 14.

The bearing pad 19 which cooperates with the surface 15 is mounted in an entirely similar manner on a free end 30 of a leaf spring 34 which is fixed at its opposite end 35 to an inner wall 36 of the upright 4. The rigidity of the spring 34 is conveniently less than that of the gaps under the working conditions so that any dimensional irregularities in the slide surfaces are compensated for by bending of the spring itself without substantial alterations in the operating conditions of the bearing pads.

Finally, the bearing pad 20 is mounted, again by an adjustment pin and a ball joint, on an outer shoulder 37 of the upright 4 and cooperates with the inclined surface 16.

By virtue of the inclined arrangement of the surface 16, the force exchanged between the bearing pad 20 and the said surface balances the resultant of the forces exchanged between the bearing pads 18,19 and the respective surfaces 14, 15.

In the embodiment of the assembly 10 illustrated in FIG. 3, the surfaces 14 and 15 are defined by a side edge portion of the upper surface of the base 2 and a side surface of the base itself respectively. The inclined surface 16 is defined by a side of a V-shaped channel 38 in a lower face of the base 2 and, in particular, by the side closest to the edge of the base 2 itself; the plane in which the surface 16 lies forms acute internal dihedral angles $\alpha$, $\beta$ with the planes in which the surfaces 14 and 15 lie.

The bearing pads 18 and 19 are mounted, as described with reference to FIG. 3, on the base wall 29 of the upright 4 and on the side shoulder 37 thereof. The bearing pad 20 cooperates with the inclined surface 16 and is mounted on a leaf spring 34 fixed beneath the shoulder 37 of the upright 4.

In the embodiment illustrated in FIG. 4, the surfaces 14, 15, 16 are formed on a guide 39 made of ferromagnetic material and fixed to a side of the base 2. More particularly, the surfaces 14 and 15 are defined respectively by an upper face and a side face of the guide 39; the respective bearing pads 18, 19 are mounted in a similar manner to that described above on respective walls 29, 37 of the upright 4. The inclined surface 16 is defined by a bevelled face of the guide 39 extending between the surfaces 14 and 15 and forming respective obtuse dihedral angles $\alpha'$ and $\beta'$ with these latter.

The bearing pad 20 is not of pneumatic type but of magnetic type and exerts an attractive force on the surface 16 which balances the resultant of the forces exerted by the bearing pads 14, 15 on the respective slide surfaces 18, 19.

The bearing pad 20 includes a support 40 fixed in an adjustable manner to the shoulder 37 and a permanent magnet 44 housed in the support 40 and facing the surface 16. More particularly, the support 40 is fixed to the shoulder 37 by a pair of traction screws 45 screwed into respective threaded holes 46 in the support itself and housed in respective seats 47 in the shoulder 37 defining an axial abutment 48 for the heads 49 of the screws themselves, and a pressure screw 50 screwed into a through-hole 51 in the shoulder 37 and cooperating with the support 40 at a point not aligned with the holes 46. It is possible to adjust the distance of the magnet from the surface 16 and the inclination of the magnet itself by adjustment of the screws 45 and 50.

From an examination of the various embodiments of the present invention, the advantages to be derived therefrom are clear.

The use of only three slide surfaces, of which two are perpendicular to each other and another is inclined such that the bearing pad (or bearing pads) cooperating with the latter balance the resultant of the loads exerted by the other bearing pads, enables the portal 4 to be guided precisely but at considerably less cost than provided by the known solutions which use four slide surfaces. In fact, the reduction in the number of slide surfaces involves a consequent reduction in the costs connected with the mechanical working of the surfaces themselves as well as a reduction in the number of the bearing pads.

Finally it is clear that modifications and variations may be made to the support and guide assembly described above without thereby departing from the scope of protection of the present invention.

For example, in the assembly of FIG. 4, only the slide surface 16 need be formed on a ferromagnetic guide while the surfaces 14 and 15 may be formed directly on the base.

We claim:

1. An assembly (10) for supporting and guiding a movable member (3) of a machine (1) for movement along an axis (X) relative to a support member of the machine (1) itself, of the type comprising a first slide surface (14) formed on the support member (2) and extending parallel to the said axis X, at least a first bearing pad fixed to the movable member (3) and slidable on the first surface (14), a second slide surface (15) formed on the support member (2) and extending parallel to the said axis (X), at least one second bearing pad (19) fixed to the movable member (3) and slidable on the second surface (15), the first and second surfaces (14, 15) extending in respective planes which intersect each other, characterized in that it includes a third slide surface (16) formed on the support member and extending in a direction parallel to the said axis (X) and in a plane inclined to the said planes in which the first and second slide surfaces (14, 15) lie, and at least one third bearing pad (20) fixed to the movable member (3), slidable on the third surface (16) and arranged to balance the loads exerted by the first and second bearing pads (18, 19) on the first and second slide surfaces (14, 15) and further characterized in that the third bearing pad is magnetic, the third surface lying in a plane forming respective obtuse internal dihedral angles with the planes in which the first and second surfaces lie.

2. An assembly according to claim 1, characterised in that the planes in which the first surface (14) and the second surface (15) lie are perpendicular to each other.

3. An assembly according to claim 1, characterised in that at least the first and second bearing pads (18, 19) are pneumatic.

4. An assembly according to claim 1, characterised in that the third bearing pad is pneumatic and the third surface (16) lies in a plane forming respective acute internal dihedral angles ($\alpha, \beta$) with the planes in which the first and second surfaces (14, 15) lie.

5. An assembly according to claim 1, characterised in that at least one of the slide surfaces (16) is defined by a face of a channel (25; 38) formed in the base.

6. An assembly according to claim 1, characterised in that one of the bearing pads (19, 20) is fixed to the movable member (3) by resilient means (34).

7. An assembly according to claim 6, characterised in that the resilient means comprise a leaf spring (34).

8. An assembly according to claim 1, characterised in that the third surface (16) extends between the first surface (14) and the second surface (15).

9. An assembly according to claim 1, characterised in that at least the third surface (16) is formed on a guide (39) of ferromagnetic material.

10. An assembly according to claim 1, characterised in that it includes at least two groups (17) of bearing pads, each of these groups (17) including respective said first, second and third bearing pads (18, 19, 20).

11. An assembly according to claim 10, characterised in that the groups of bearing pads (17) are spaced apart along the said axis (X).

12. An assembly according to claim 1, characterised in that the support member (2) and the movable member (3) belong to a measuring machine (1).

13. An assembly according to claim 11, characterised in that the support member is a base (2) of the measuring machine (1) and the movable member is a portal (3) of the measuring machine (1).

14. A measuring machine (1) characterised in that it includes at least one assembly (10) for supporting and guiding a movable member (3) according to claim 1.

* * * * *